United States Patent
Sugisawa

(10) Patent No.: US 6,404,330 B1
(45) Date of Patent: Jun. 11, 2002

(54) APPARATUS AND METHOD FOR ALARMING DECREASE IN TIRE AIR-PRESSURE

(75) Inventor: Toshifumi Sugisawa, Kobe (JP)

(73) Assignees: Sumitomo Rubber Industries, Ltd., Hyogo-ken; Sumitomo Electric Industries, Ltd., Osaka, both of (JP)

( * ) Notice: Subject to any disclaimer, the term of this patent is extended or adjusted under 35 U.S.C. 154(b) by 0 days.

(21) Appl. No.: 09/945,664

(22) Filed: Sep. 5, 2001

(30) Foreign Application Priority Data

Sep. 5, 2000 (JP) ......................................... 2000-269049

(51) Int. Cl.$^7$ ............................................. B60C 23/00
(52) U.S. Cl. ................... 340/444; 340/995; 340/990; 340/445; 701/29; 701/207; 701/209; 701/211
(58) Field of Search ................................. 340/990, 995, 340/444, 442, 443, 445, 438, 439, 825.36, 825.49; 701/24, 29, 213, 208, 209, 207, 211

(56) References Cited

U.S. PATENT DOCUMENTS

| | | | | |
|---|---|---|---|---|
| 5,177,685 A | * | 1/1993 | Davis et al. | 340/995 |
| 5,569,848 A | * | 10/1996 | Sharp | 340/444 |
| 5,677,837 A | * | 10/1997 | Reynolds | 701/207 |
| 6,137,400 A | * | 10/2000 | Yanase et al. | 340/444 |

FOREIGN PATENT DOCUMENTS

| | | |
|---|---|---|
| DE | 19605458 C | 6/1997 |
| EP | 0341226 A | 11/1989 |
| WO | WO/0049680 A | 8/2000 |

* cited by examiner

*Primary Examiner*—Jeffery Hofsass
*Assistant Examiner*—Daniel Previl
(74) *Attorney, Agent, or Firm*—Birch, Stewart, Kolasch & Birch, LLP

(57) ABSTRACT

An apparatus for alarming a decrease in tire air-pressure by using a judged value calculated based on rotational information obtained from tires fitted to a four-wheeled vehicle. The apparatus comprises: traveling determining means for determining whether the vehicle should be stopped at once or the vehicle can still travel to some extent; vehicle position detecting means; collating means for collating the detected vehicle traveling position with positional information on a blowout repairing facility; facility calling means for calling a nearest blowout repairing facility; and display means for displaying a route from the vehicle traveling position to the called facility. The apparatus according to the present invention can teach the route to the blowout repairing facility after giving the alarm of the decrease in tire pressure, thus achieving the repairing of blown-out tire after the safe traveling.

8 Claims, 5 Drawing Sheets

APPARATUS AND METHOD FOR ALARMING DECREASE IN TIRE AIR-PRESSURE

BACKGROUND OF THE INVENTION

The present invention relates to an apparatus and a method for alarming a decrease in tire air-pressure and, more particularly, to an apparatus and a method for alarming a decrease in tire air-pressure, which can teach a route to a blowout repairing facility being open and can achieve safe traveling.

It is most dangerous in case of a tire blowout that a driver continues traveling without any awareness of the blowout. In view of this, there has been conventionally known a tire air-pressure alarming apparatus (DWS) for giving an alarm to a driver about a decrease in pressure of a tire upon detection of the decrease in pressure of the tire.

However, even if the alarming apparatus can detect the tire blowout so as to prevent an accident, no consideration is given to repairing of the blown-out tire which is needed at a next step.

Should a blowout alarm be given during traveling on an expressway, it is difficult for a driver to judge how far it is to a next service area or how far the blown-out tire endures traveling. Therefore, some of drivers might stop their cars on a road shoulder of the expressway to repair the blown-out tire even in the case where the blown-out tire could endure traveling to the next service area. However, it is dangerous to repair the blown-out tire on the road shoulder of the expressway.

Furthermore, since a blowout repairing facility being open is limited in quantity during traveling in, for example, a suburb of a city in the nighttime, it is difficult for a driver to find out such a facility at once.

Moreover, a driver might be exposed to a danger during repairing a blown-out tire in a region of a low level of security.

Consequently, although the conventional apparatus for alarming the decrease in tire air-pressure can prevent any accident caused by the blowout, the apparatus cannot at all eliminate the danger and inconvenience in the case where the driver possibly repairs the blown-out tire on the road shoulder of the expressway or in the region of a low level of security.

In view of the above-described circumstances, an object of the present invention is to provide an apparatus and a method for alarming a decrease in tire air-pressure, which can teach a route to a blowout repairing facility being open and can achieve safe traveling.

SUMMARY OF THE INVENTION

In accordance with the present invention, there is provided an apparatus for alarming a decrease in tire air-pressure which alarms the decrease in inner pressure of the tire by using a judged value calculated based on rotational information obtained from tires fitted to a four-wheeled vehicle, comprising: traveling determining means for determining whether the vehicle should be stopped at once or the vehicle can still travel to some extent when the decrease in tire air-pressure is judged; vehicle position detecting means for detecting a vehicle traveling position at the time of judgment of the decrease in tire air-pressure; collating means for collating the detected vehicle traveling position with positional information on a blowout repairing facility, which has been input previously; facility calling means for calling a nearest blowout repairing facility being open based on the collation by the collating means; and display means for displaying a route from the vehicle traveling position to the called facility, wherein the vehicle position detecting means, the collating means, the facility calling means and the display means are started to be operated in the case where the traveling determining means determines that the vehicle can still travel to some extent.

In accordance with the present invention, there is further provided an apparatus for alarming a decrease in tire air-pressure which alarms the decrease in inner pressure of the tire by using a judged value calculated based on rotational information obtained from tires fitted to a four-wheeled vehicle, comprising: vehicle position detecting means for detecting a vehicle traveling position at the time of judgment of the decrease in tire air-pressure; collating means for collating the detected vehicle traveling position with positional information on a blowout repairing facility, which has been input previously; and threshold value changing means for changing a threshold value of the judgement of the decrease in inner pressure of the tires according to the vehicle traveling position.

In accordance with the present invention, there is also provided a method for alarming a decrease in tire air-pressure which alarms the decrease in inner pressure of the tire by using a judged value calculated based on rotational information obtained from tires fitted to a four-wheeled vehicle, comprising the steps of: detecting a vehicle traveling position at the time of judgment of the decrease in tire air-pressure; collating the detected vehicle traveling position with positional information on a blowout repairing facility, which has been input previously; calling a nearest blowout repairing facility being open based on the collation; and displaying a route from the vehicle traveling position to the called facility, wherein the steps are started to be performed in the case where it is determined that the vehicle can still travel to some extent.

In accordance with the present invention, there is yet further provided a method for alarming a decrease in tire air-pressure which alarms the decrease in inner pressure of the tire by using a judged value calculated based on rotational information obtained from tires fitted to a four-wheeled vehicle, comprising the steps of: detecting a vehicle traveling position at the time of judgment of the decrease in tire air-pressure; collating the detected vehicle traveling position with positional information on a blowout repairing facility, which has been input previously; and changing a threshold value of the judgement of the decrease in inner pressure of the tires according to the vehicle traveling position.

DETAILED DESCRIPTION

An apparatus and a method for alarming a decrease in tire air-pressure according to the present invention will be described below in reference to the accompanying drawings.

Figure 1:
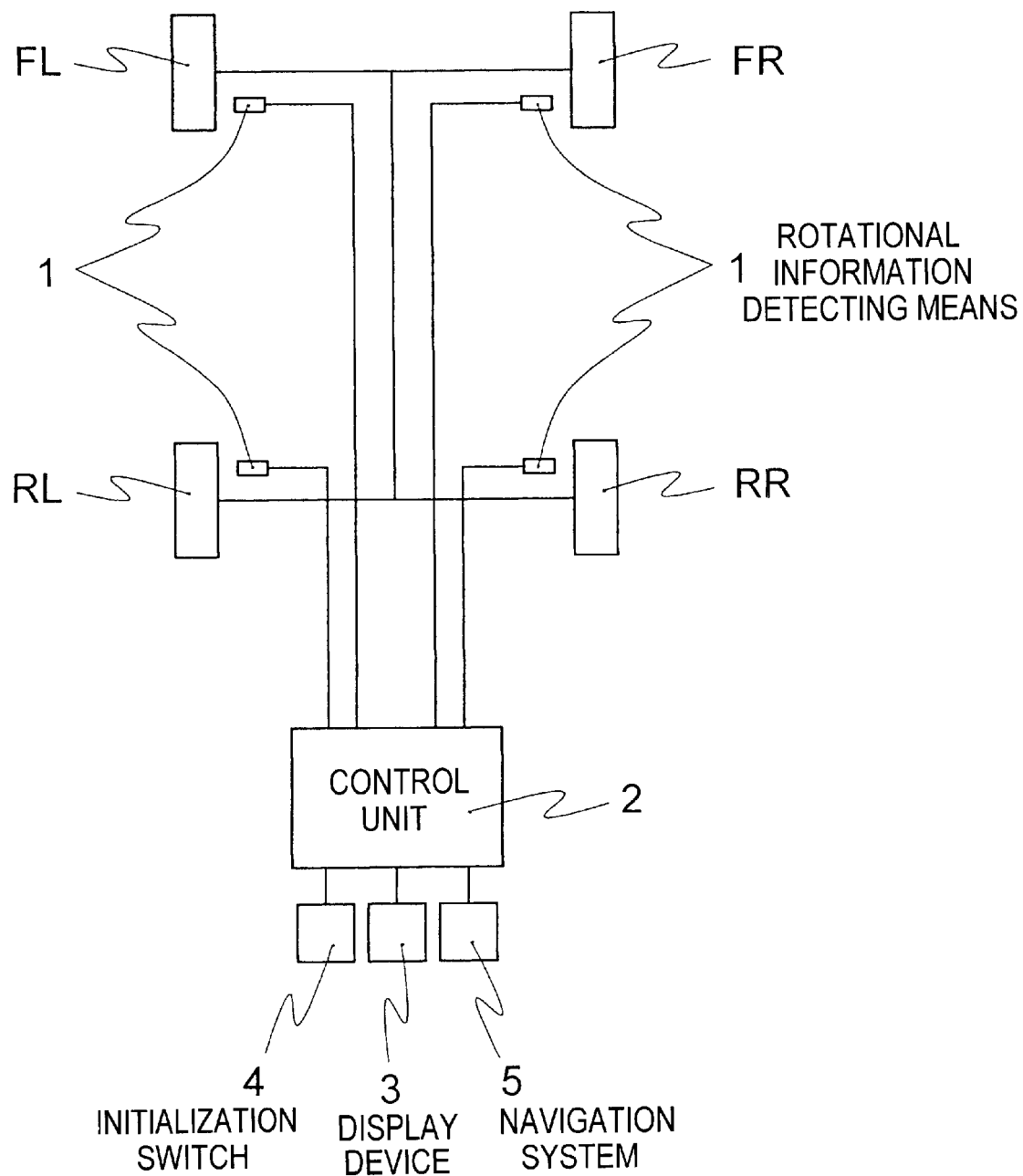
FIG. 1 is a block diagram illustrating an embodiment of an apparatus for alarming a decrease in tire air-pressure according to the present invention.

As shown in FIG. 1, an embodiment of an apparatus for alarming decrease in tire air-pressure according to the present invention is so designed as to detect whether or not pneumatic pressures of four tires FL, FR, RL and RR ($W_i$, i=1~4, 1: front left tire, 2: front right tire, 3: rear left tire, 4: rear right tire) attached to, for example, a four-wheeled vehicle are decreased, and is provided with popular rotational information detecting means 1 respectively provided in connection with each tire $W_i$.

The rotational information detecting means 1 takes the form of, for example, a wheel speed sensor for measuring a rotational speed from the number of rotation pulses generated by using an electromagnetic pickup of the like, or an angular velocity sensor for measuring a rotational speed from a voltage generated by using rotation by a dynamo electric. Output of the rotational information detecting means 1 and a lateral G sensor is applied to a control unit 2. To the control unit 2, a display device 3 for informing of the tire $W_i$ having a decreased pneumatic pressure, the display device 3 being constituted by a liquid crystal display element, a plasma display element, a CRT or the like, and an initialization switch 4 capable of being operated by a driver are connected. In this case, reference numeral 5 denotes a navigation system.

Figure 2:
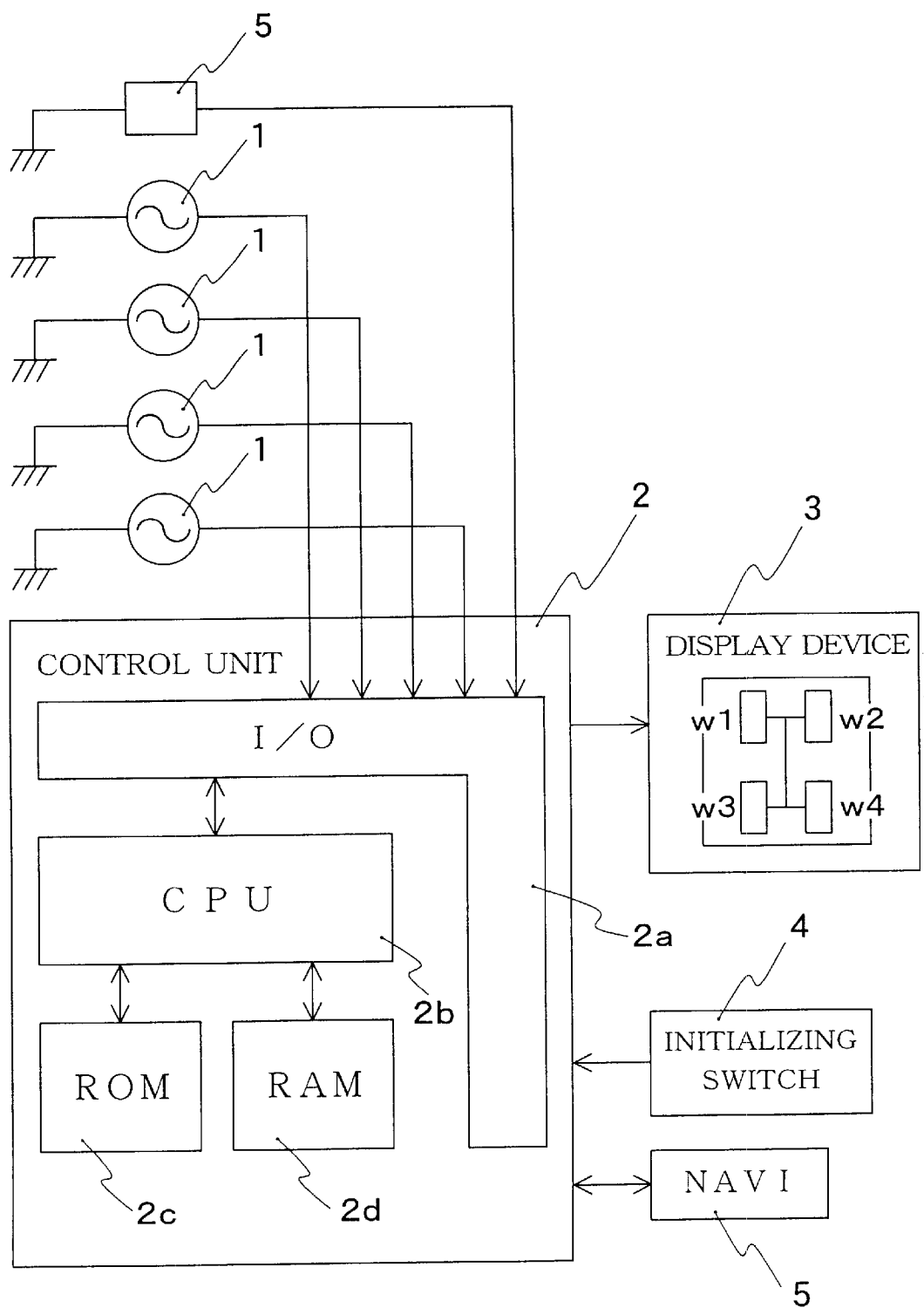
FIG. 2 is a block diagram illustrating electric configuration of the apparatus for alarming a decrease in tire air-pressure of FIG. 1.

The control unit 2 includes, as shown in FIG. 2, an I/O interface 2a required for giving and taking a signal with respect to an external device, a CPU 2b functioning as a center of a calculating process, a ROM 2c storing a control operation program of the CPU 2b and a RAM 2d in which data is temporarily written or the written data is read at a time when the CPU 2b executes the control operation.

The present invention is featured by sharing information stored in the apparatus for alarming a decrease in tire air-pressure and information stored in a navigation system.

The apparatus for alarming a decrease in tire air-pressure according to the present embodiment includes, for example, rotational information detecting means for detecting rotational information on each of tires, memory means for storing therein the rotational information on each of the tires, calculating means for calculating a judged value based on the rotational information on each of the tires, and judging means for judging a decrease in inner pressure of the tire based on the judged value. The apparatus further includes traveling determining means for determining whether a vehicle should be stopped at once or the vehicle can still travel to some extent when the decrease in tire air-pressure is judged; vehicle position detecting means for detecting a vehicle traveling position at the time of the judgment of the decrease in tire air-pressure; collating means for collating the detected vehicle traveling position with positional information on a blowout repairing facility, which has been input previously; facility calling means for calling a nearest blowout repairing facility being open based on the collation by the collating means; and display means for displaying a route from the vehicle traveling position to the called facility.

In the present embodiment, the vehicle position detecting means, the collating means, the facility calling means and the display means are started to be operated in the case where the traveling determining means determines that the vehicle can still travel to some extent.

That is to say, the apparatus for alarming a decrease in tire air-pressure is equipped with the function of determining whether or not the vehicle can reach the nearest blowout repairing facility based on the judged value used for judging the decrease in pressure in the apparatus for alarming a decrease in tire air-pressure or its variation. For example, when the judged value is moderately varied and it is judged that there is no possibility of an abrupt burst after the judged value exceeds a predetermined threshold value and the decrease in pressure is determined, a driver is guided to the nearest blowout repairing facility. In this manner, the driver can know a route to the blowout repairing facility being open and safely drive the vehicle. In contrast, the driver is called to stop the vehicle in the case where the judged value is markedly large or the variation is large and there is a danger of a burst until the driver reaches the nearest blowout repairing facility. Consequently, the driver can replace the tire by himself or herself, and further, can make contact with the nearest blowout repairing facility being open or an on-site service to have the tire replaced.

The method for determining whether the vehicle should be stopped at once or the vehicle can still travel to some extent when the decrease in tire air-pressure is judged is exemplified as follows:

A wheel speed per second of a sampling time is first captured based on a wheel speed pulse, a judged value of a decrease in pressure of a tire (DEL) is calculated, the DEL values are averaged per sampling time, for example, every five seconds in order to enhance the accuracy of the judgement, past twelve 5-second average values (DEL5) are subjected to processing of moving averages, and then, the decrease in pressure is judged by the use of the resultant moving average value (DELAV), resulting in a judgement (1) or (2) under the following conditions (A) to (C):

(A) $|DELAV| \geq 0.1$ (B) $|DEL5| \geq 0.15$ occurs four times in sequence (C) $|DEL5| \geq 0.1$, and the condition that an increase in DEL5 is 0.033 or more occurs four times in sequence (1) When the condition (B) or (C) is satisfied, it is judged that the vehicle should be stopped at once.

(2) When the condition (A) is satisfied but the conditions (B) and (C) are not satisfied, it is judged that the pressure is decreased and the vehicle can still travel to some extent.

As the vehicle position detecting means can be used a car navigation device using a GPS antenna or the like.

As the above-described car navigation device, there can be used one which detects the traveling position by using an antenna for a GPS (global positioning system) or the like, inputs map data on the surroundings of the traveling position into a car navigation body via a CD-ROM, and displays geographic information on a display panel or the like through the processing of a map displaying routine. Furthermore, the car navigation device receives road information from an outside transmitter such as a beacon or an FM transmitter installed with respect to a road via a beacon antenna, and additionally displays the road information on the display panel or the like through the processing of a displaying routine of the navigation body. In the case where the above-described car navigation device is used, the display panel can serve as the display means.

As the collating means, there can be used one which stores at the positional information on, for example, the position, service day and service time of the blowout repairing facility in a CD-ROM or the like in the form of a database, and collates the positional information with the detected vehicle traveling position so as to extract the facility being open based on the current time and position, or calculates a distance based on the current time and position so as to make a search for the nearest facility.

Figure 3:
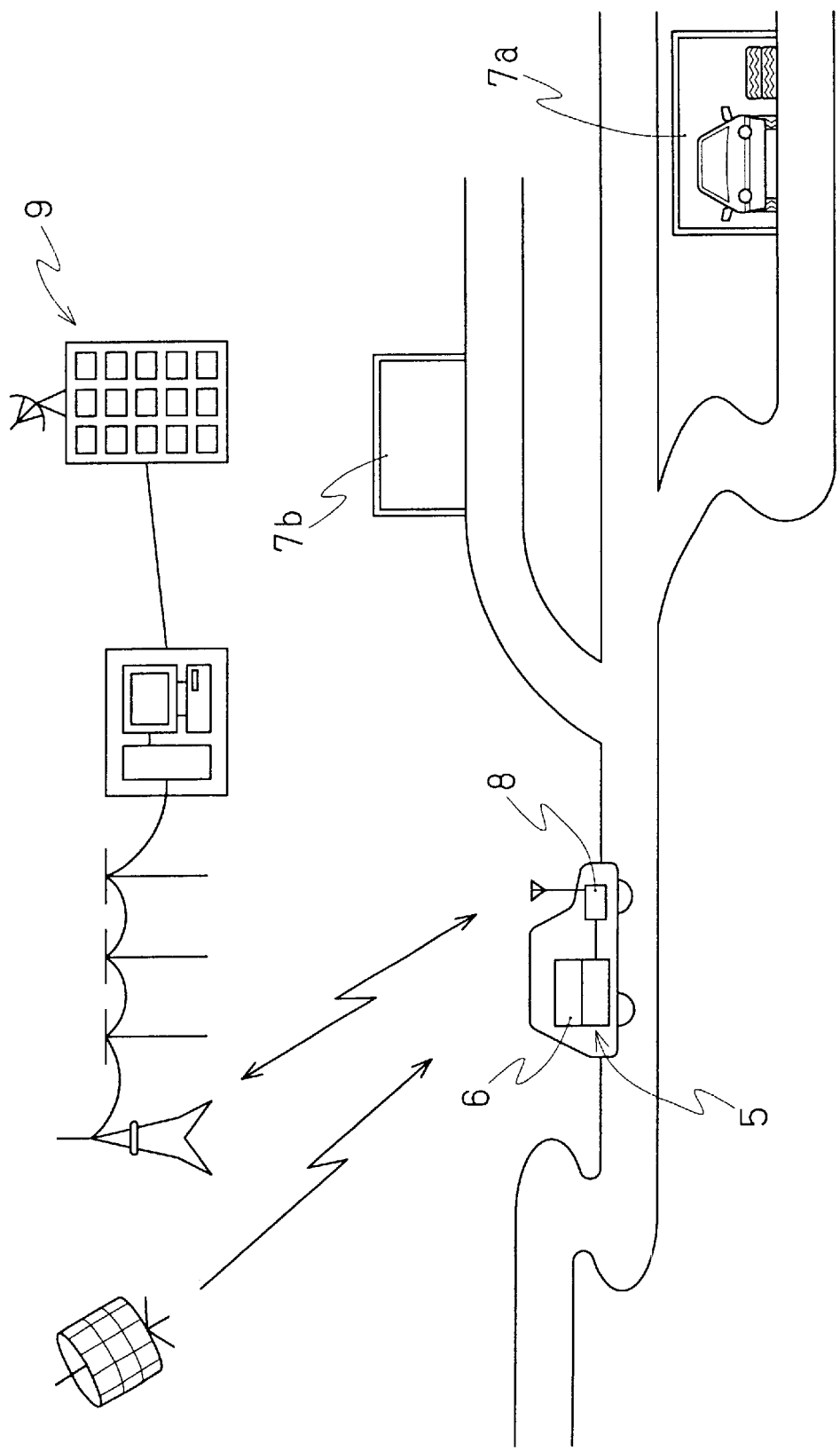
FIG. 3 illustrates the situation in which the apparatus for alarming a decrease in tire air-pressure calls a blowout repairing facility and teaches a route to the facility.

In the present embodiment, the vehicle position detecting means and the collating means constitute a navigation system 5, which is mounted on a vehicle, as illustrated in FIG. 3.

Thus, when the apparatus 6 for alarming a decrease in tire air-pressure detects a decrease in tire air-pressure, the navigation system 5 finds the position, searches a nearest blow-out repairing facility 7a being open at that time out of blowout repairing facilities 7a and 7b which have been previously registered in the navigation system 5 and at which a blown-out tire can be repaired, and then, teaches the driver a shortest route to the facility 7a.

In addition to the function of searching the position of the vehicle, information on facilities (such as a location, a service time, a closing day and a telephone number) in which the blown-out tire can be repaired (such as a parking area, a service area, a gas station and a tire shop) has been previously registered in the navigation system 5. Moreover, it is preferable that a dangerous region or the like in view of security should be registered as required.

In this manner, when the apparatus for alarming the decrease in tire air-pressure detects the decrease in pressure of the tire, the apparatus first searches the nearest blowout repairing facility being open at that time on that day based on the information, and then, teaches the driver the shortest route to the facility. At the same time, the apparatus also displays a telephone number or the like, thereby enabling the driver to make contact with the facility via a mobile phone or the like.

If there is no facility being open thereabouts, the apparatus can display a telephone number of an on-site service.

The embodiment according to the present invention will be described with reference to FIGS. 3 and 4. As illustrated in FIG. 3, the apparatus is provided with communication means 8 capable of communicating with the outside of the vehicle. As the communication means 8 can be used a radio telephone line such as a PHS, a radio device in conformance with the radio telephone line or the like. The communication means 8 makes access to the positional information on the blowout repairing facility 7a or 7b input in a computer outside of the vehicle, for example, means such as a host computer 9 of the VICS (Vehicle Information Communication System) via the Internet.

Figure 4:
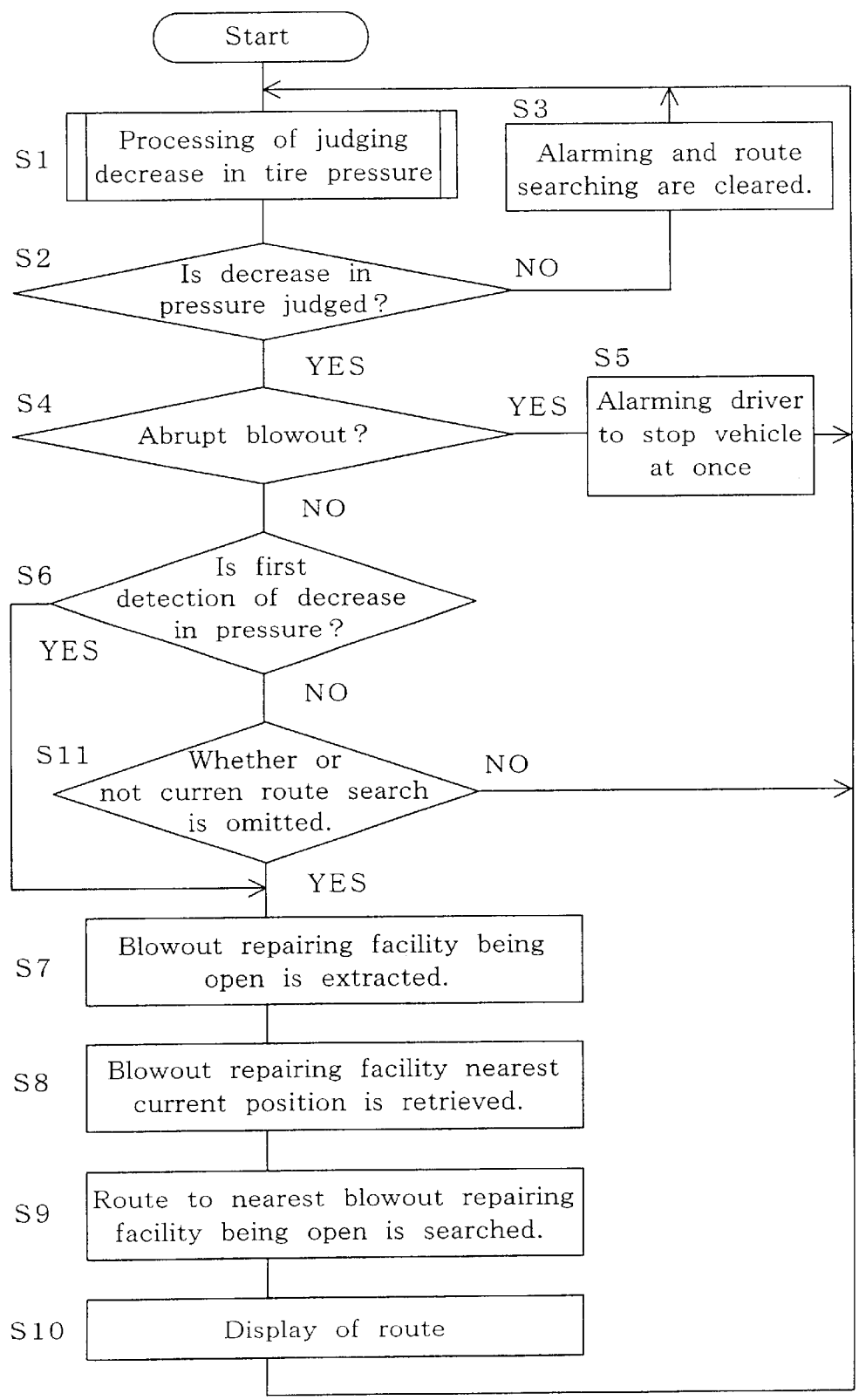
FIG. 4 is a flowchart illustrating the processing of displaying the route to a nearest blowout repairing facility being open after a decrease in pressure is judged.

First, as illustrated in FIG. 4, the processing of judging the decrease in tire pressure of the traveling vehicle is performed (step S1). The processing of judging the decrease in pressure in the apparatus for alarming the decrease in tire air-pressure at that time is performed according to, for example, the following procedures. After rotational information detecting means 1 outputs a pulse signal corresponding to the number of revolutions of each of tires $W_i$ (hereinafter referred to as a wheel speed pulse), a CPU 2b calculates a rotational angular velocity $F_i$ of each of the tires $W_i$ per predetermined sampling cycle $\Delta T$ (sec.), for example, per second based on the wheel speed pulse output from the rotational information detecting means 1.

Here, since tires $W_i$ are manufactured while irregularity is present within a specification (initial difference), the effective rolling radii of the tires $W_i$ (values each obtained by dividing a distance advancing by one rotation by $2\pi$) are not necessarily equal even if all of the tires $W_i$ have ordinary internal pressure. As a result, the rotational angular velocities $F_i$ of the tires $W_i$ become irregular. Considering this, a corrected rotational angular velocity $F1_i$ to cancel the irregularity due to the initial difference is calculated. To be specific, the respective rotational angular velocity is corrected as follows:

$F1_1 = F_1$
$F1_2 = mF_2$
$F1_3 = F_3$
$F1_4 = nF_4$

Correction coefficients m and n are obtained as $m = F_1/F_2$ and $n = F_3/F_4$ by calculating the rotational angular velocity $F_i$ under conditions, for example, that a vehicle is running on a straight road and then obtaining the coefficients m and n based on the calculated rotational angular velocity $F_i$. Based on above $F1_i$, a vehicle speed V ($V_i/4$) is are calculated.

Further, a pressure reduction judged value (DEL) for detecting decrease in air-pressure of the tire $W_i$ is to compare the difference between, for example, two sums of pairs of front-wheel tires and rear-wheel tires on a diagonal. Specifically, the sum of signals from one pair of wheels on a diagonal is subtracted from the sum of signals from the other pair of wheels on the diagonal, and a ratio of the subtraction result to the average value of the two sums is obtained from the following formula (1):

$$DEL = \frac{2 \times \{(V1 + V4) - (V2 + V3)\}}{V1 + V2 + V3 + V4} \times 100\% \qquad (1)$$

Subsequently, as the result of the judgement about the decrease in pressure, if the decrease in pressure is not judged (step S2), alarming and route searching are cleared (step S3). In contrast, if the decrease in pressure is judged (step S2), it is judged whether the vehicle should be stopped at once since the judged value signifies an abrupt blowout or the vehicle can still travel to some extent (step S4). Here, in case of an abrupt blowout, the driver is alarmed to stop the vehicle at once (step S5).

Next, in the case of not an abrupt blowout (step S4), it is judged whether or not the decrease in pressure is judged by a first detection of the decrease in pressure (step S6). If the decrease in pressure is judged by the first detection of the decrease in pressure, the blowout repairing facility being open is extracted (step S7). After the blowout repairing facility nearest the current position is retrieved and searched (steps S8 and S9), the apparatus displays the route to the nearest blowout repairing facility being open so as to teach it to the driver (step S10). Here, since there is a danger of omission of the route search unless the decrease in pressure is judged by the first detection of the decrease in pressure in step S6, it is judged whether or not the current route search is omitted.

In this manner, the driver can know the route to the blowout repairing facility being open, and can safely drive.

An apparatus for alarming a decrease in tire air-pressure in another preferred embodiment according to the present invention is provided with threshold value changing means for changing a threshold value of the judgement of a decrease in tire air-pressure according to a traveling position of a vehicle.

In judging the decrease in tire air-pressure (judgement of the decrease in pressure) in the apparatus for alarming the decrease in tire air-pressure, the threshold value of the judgement of the decrease in tire air-pressure is set lower than a usual value by the threshold value changing means during traveling in a region or a time zone in which it seems to be preferable to give an alarm indicating the decrease in pressure to the driver earlier than usual in the case where, for example, there is no blowout repairing facility being open at that time thereabouts or a vehicle travels in a region of a low level of security based on information stored in a navigation system.

Namely, in order to avoid any situation in which the driver cannot reach the blowout repairing facility, a blowout alarm is given earlier than usual during traveling in an area in which the repairing facility is few in quantity. The apparatus for alarming the decrease in tire air-pressure judges based on the judged value whether or not the tire blows, and if its threshold value is too small, a blowout might be erroneously judged in spite of a normal inner pressure. Therefore, the threshold value takes a large value to such a certain extent that no alarm is given with an error occurring under normal inner pressure.

However, from the viewpoint of the safeness for the driver, it is desirable to earlier notify the driver of the possibility of the decrease in tire pressure even with a fear of an erroneous alarm during traveling in the area or time zone in which the repairing facility is few in quantity or in the region of a low level of security. Consequently, in order to promote early inspection in the tire repairing facility, the threshold value is set to a slightly small value so as to easily give an alarm under the above-described circumstance.

Figure 5:
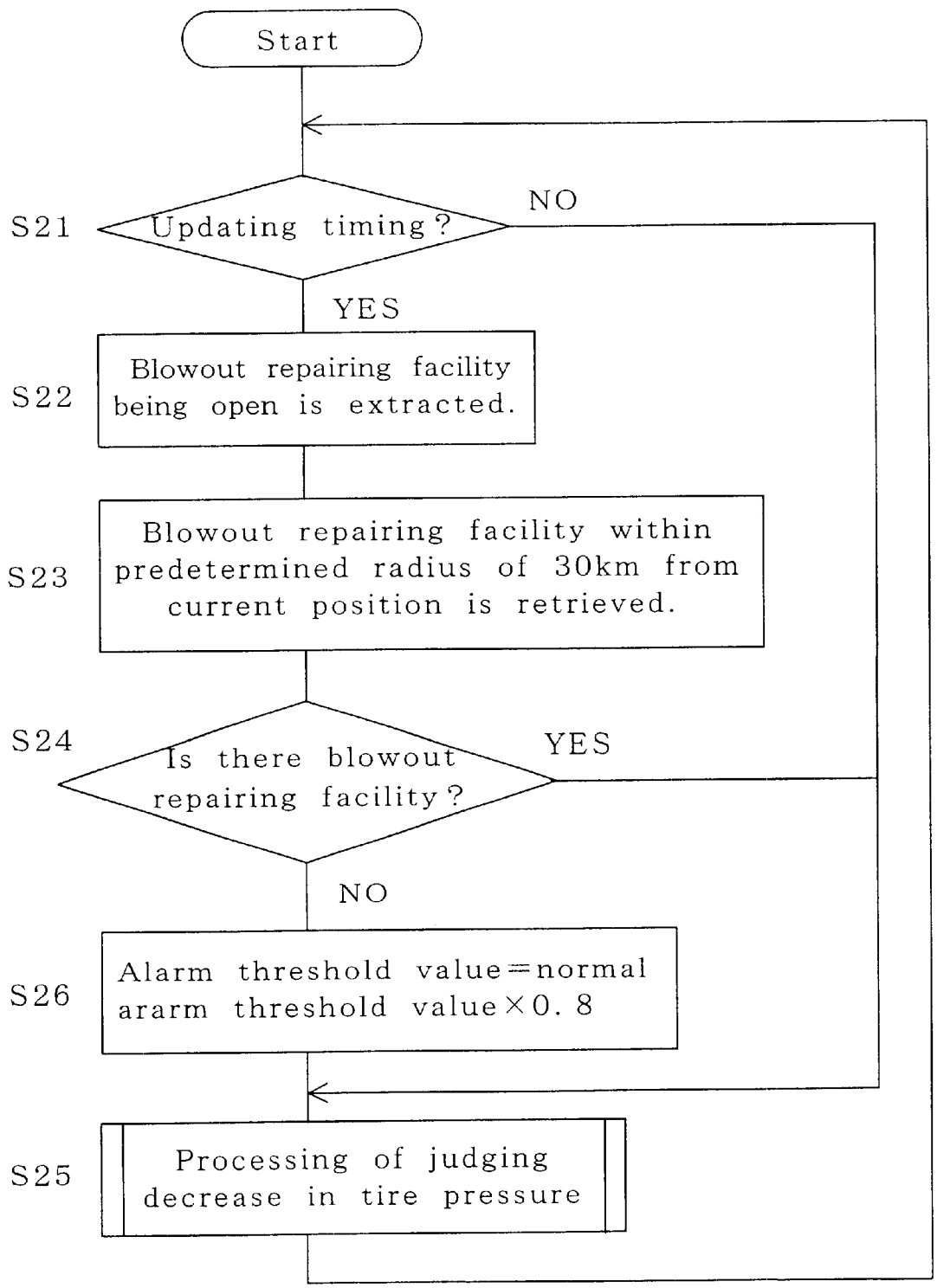
FIG. 5 is a flowchart illustrating the processing of reducing a threshold value so as to easily give an alarm.

A further embodiment according to the present invention will be explained below with reference to FIG. 5. First in step S21, a blowout repairing facility being open is extracted based on a current position at an updating timing, for example, once every ten minutes (step S22), and then, it is retrieved whether or not there is a blowout repairing facility within a predetermined radius of 30 km from the current position (step S23). As a result of the retrieval, when there is a blowout repairing facility being open within a radius of 30 km from the current position (step S24), the decrease in pressure is judged based on a normal alarm threshold value at the time of the decrease in tire air-pressure (step S25). In contrast, if there is no blowout repairing facility being open within a radius of 30 km from the current position (step S24), the alarm threshold value at the time of the decrease in tire air-pressure is set to 0.8 times the normal threshold value since it seems to be preferable for the driver to give an alarm of the decrease in pressure earlier than usual (step S26). Thereafter, the decrease in pressure is judged (step S25). Thus, the driver can be notified of the judgement of the decrease in pressure earlier than usual, and therefore, can safely drive.

Incidentally, in the above-described embodiments, the information registered in the navigation system can be updated by loading down latest data from an information terminal such as a mobile telephone.

In this manner, the addition of the information registered in the navigation system to the conventional apparatus for alarming the decrease in tire air-pressure can provide not only the apparatus for simply alarming the decrease in tire pressure but also the information for safely and speedily repairing the blown-out tire, or can provide higher safeness for the driver by early giving the alarm according to the traveling region or time zone so as to avoid such a situation in which the driver cannot reach the blowout repairing facility.

As described above, the apparatus for alarming the decrease in tire air-pressure according to the present invention can teach the route to the blowout repairing facility after giving the alarm of the decrease in tire pressure, thus achieving the repairing of blown-out tire after the safe traveling.

What is claimed is:

1. An apparatus for alarming a decrease in tire air-pressure which alarms the decrease in inner pressure of the tire by using a judged value calculated based on rotational information obtained from tires fitted to a four-wheeled vehicle, comprising: traveling determining means for determining whether the vehicle should be stopped at once or the vehicle can still travel to some extent when the decrease in tire air-pressure is judged; vehicle position detecting means for detecting a vehicle traveling position at the time of judgment of the decrease in tire air-pressure; collating means for collating the detected vehicle traveling position with positional information on a blowout repairing facility, which has been input previously; facility calling means for calling a nearest blowout repairing facility being open based on the collation by the collating means; and display means for displaying a route from the vehicle traveling position to the called facility, wherein the vehicle position detecting means, the collating means, the facility calling means and the display means are started to be operated in the case where the traveling determining means determines that the vehicle can still travel to some extent.

2. The apparatus of claim 1, wherein the positional information on the blowout repairing facility is input in a navigation system.

3. An apparatus for alarming a decrease in tire air-pressure which alarms the decrease in inner pressure of the tire by using a judged value calculated based on rotational information obtained from tires fitted to a four-wheeled vehicle, comprising: vehicle position detecting means for detecting a vehicle traveling position at the time of judgment of the decrease in tire air-pressure; collating means for collating the detected vehicle traveling position with positional information on a blowout repairing facility, which has been input previously; and threshold value changing means for changing a threshold value of the judgement of the decrease in inner pressure of the tires according to the vehicle traveling position.

4. The apparatus of claim 3, wherein the positional information on the blowout repairing facility is input in a navigation system.

5. A method for alarming a decrease in tire air-pressure which alarms the decrease in inner pressure of the tire by using a judged value calculated based on rotational information obtained from tires fitted to a four-wheeled vehicle, comprising the steps of: detecting a vehicle traveling position at the time of judgment of the decrease in tire air-pressure; collating the detected vehicle traveling position with positional information on a blowout repairing facility, which has been input previously; calling a nearest blowout repairing facility being open based on the collation; and displaying a route from the vehicle traveling position to the called facility, wherein the steps are started to be performed in the case where it is determined that the vehicle can still travel to some extent.

6. The method of claim 5, wherein the method includes a step of accessing positional information on the blowout repairing facility input in a computer outside of the vehicle by means of a communication means capable of communicating with the outside of the vehicle.

7. A method for alarming a decrease in tire air-pressure which alarms the decrease in inner pressure of the tire by using a judged value calculated based on rotational information obtained from tires fitted to a four-wheeled vehicle, comprising the steps of: detecting a vehicle traveling position at the time of judgment of the decrease in tire air-pressure; collating the detected vehicle traveling position with positional information on a blowout repairing facility, which has been input previously; and changing a threshold value of the judgement of the decrease in inner pressure of the tires according to the vehicle traveling position.

8. The method of claims 7, wherein the method includes a step of accessing positional information on the blowout repairing facility input in a computer outside of the vehicle by means of a communication means capable of communicating with the outside of the vehicle.

* * * * *